Dec. 8, 1964    W. A. MIDDLETON    3,160,016
EMULSION SAMPLING DEVICE
Filed Dec. 22, 1961
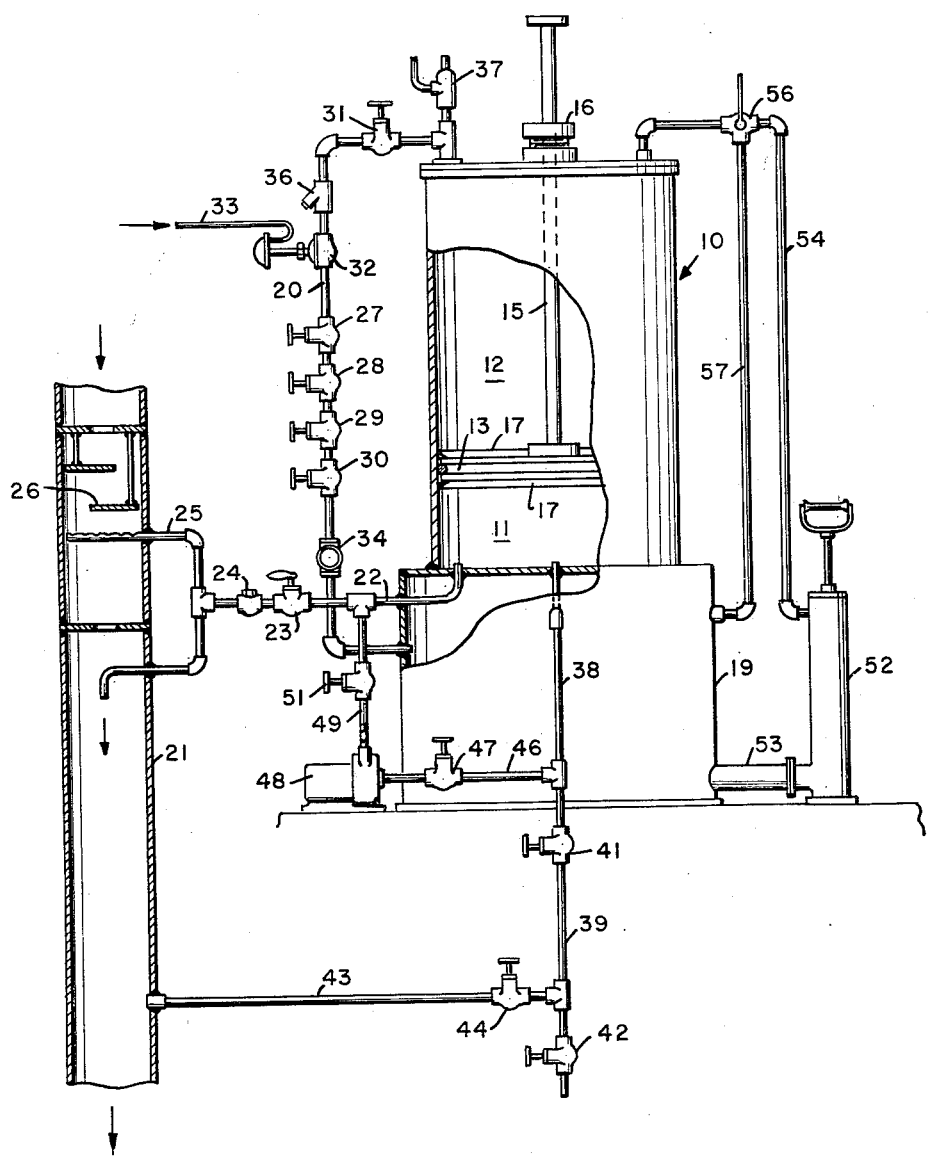
INVENTOR
WILLIS A. MIDDLETON
BY *John K. Wilkens*
HIS AGENT

United States Patent Office 3,160,016
Patented Dec. 8, 1964

3,160,016
EMULSION SAMPLING DEVICE
Willis A. Middleton, Houston, Tex., assignor to Shell Oil Company, New York, N.Y., a corporation of Delaware
Filed Dec. 22, 1961, Ser. No. 161,457
16 Claims. (Cl. 73—422)

The present invention relates to an apparatus for obtaining samples from pipelines having fluid flowing therethrough. More particularly, the invention provides an apparatus whereby fluid may be withdrawn from a pipeline continually at a controlled rate, to thereby obtain a cumulative sample of the fluid flowing therethrough.

Presently many States, such as the State of Texas, have regulations to govern the metering of oil removed from leased oil-producing formations. The principal purpose of these regulations is to assure proper compensation for the oil removed from a lease.

Oil-producing formations generally contain both oil and water. For this reason the crude oil removed from such formations comprises a mixture or an emulsion of varying proportions of oil and water. Since compensation for the lease is based primarily on the amount of oil removed therefrom it is essential that this amount be accurately determined. It is for this reason that States have enforced the above-mentioned regulations.

The regulations presently in effect require that oil field producing systems measure clean crude oil as it leaves the lease and before it is collected at a central custody location serving several producing leases. This requires that the producing systems on each lease include individual separation apparatus to treat and clean the crude oil emulsions produced therefrom. Naturally, the installation and operation of such individual apparatus results in considerable expense; an expense far exceeding that of a single separation apparatus at the central custody location having a capacity sufficient to handle the leases served thereby. Therefore, it is apparent that a device facilitating the use of a single separation apparatus at the central custody location would result in substantial savings over the individual separation apparatus presently used on each lease.

However, in order to use a single separation apparatus at a central custody location it is necessary to provide a metering system capable of accurately determining the amount of oil in the oil-water mixture or emulsion leaving the lease. It is contemplated that the determination could be made after continually sampling the emulsion as it is metered and leaves the lease. Should a sampling system be devised which is sufficiently accurate and reliable it is believed that State governments would adopt regulations condoning the use of such systems in place of the present separation apparatus required on each lease.

Fluid sampling systems in themselves are known, but the existing systems have not proved sufficiently accurate and reliable to satisfy the State regulatory agencies. It is noted that in order to determine the water content of a crude oil emulsion flowing through a pipeline it is necessary to continually sample the fluid flowing therethrough. Present sampling methods do not appear sufficiently accurate or dependable to give the required results; since they rely on meter attachments, pumps, or orifices in the sample stream to control sample withdrawal therefrom. Meter attachments and pumps have not shown the required accuracy, and orifices, although accurate, are not sufficiently reliable. The unreliable character of orifices in the sample stream results from the nature of the crude oil flowing therethrough. This crude oil generally contains impurities which tend to corrode, wear away, and plug orifices, thereby destroying their accuracy and reliability.

A primary object of the present invention is, therefore, to provide an accurate and reliable sampling apparatus.

Another object of the invention is to provide a sampling apparatus which is practical from both the installation and operation standpoint.

A further object of the invention is to provide a sampling apparatus which will be acceptable to State regulatory agencies.

Yet another object of the invention is to provide a sampling apparatus which will eliminate the need for extensive separation apparatus on each oil producing lease, thereby facilitating the use of large centrally-located separation apparatus serving a plurality of leases.

In its broadest aspect the invention includes a sampling vessel having a chamber therein divided into two sections by a moveable partition. One of said sections contains a clean fluid and has an orifice connected thereto through which the clean fluid may leave the vessel at a predetermined rate upon displacement of the moveable section. The other of said sections communicates with a pipeline having crude oil flowing therethrough and is adapted to receive a sample therefrom.

In operation the pressure within the pipeline forces crude oil into said other section and displaces the moveable section, thereby forcing clean fluid through the orifice. The rate at which the crude oil enters said other section is determined by the rate at which clean fluid may pass through the orifice.

More specifically, the invention comprises a vessel having a chamber therein sealingly divided into two sections by a moveable partition, one of said sections containing clean fluid and the other of said sections providing a receiving chamber for fluid from a pipeline; a first conduit connected to said one section whereby clean fluid may be exhausted therefrom upon displacement of the moveable section; and a second conduit connecting said other section with the pipeline whereby pipeline fluid is conveyed to said other section.

Referring to the drawing, the single figure thereof illustrates an elevational view of the present invention; parts thereof being broken away to better illustrate the internal characteristics of the apparatus.

In the drawing the numeral 10 designates a vessel divided into a crude oil receiving section 11 and a clean fluid section 12 by a floating piston 13 sealingly disposed within said vessel. The piston 13 is guided by a rod 15 connected thereto and slidably extending through a packer element 16 disposed in the top of the vessel. Sealing elements 17 are disposed around the periphery of the piston to assure that the piston sealingly separates sections 11 and 12.

A reservoir 19 is disposed below the vessel and is adapted to receive and store clean fluid. A conduit 20 extends between the section 12 and the reservoir 19 and is adapted to transmit clean fluid from the section 12 to reservoir 19 upon upward displacement of the piston 13.

The section 11 communicates with a crude oil pipeline 21 through a conduit 22 having a pet cock 23 and a check valve 24 disposed therein. Check valve 24 limits fluid flowing in the conduit 22 to movement toward the section 11. The conduit 22 is connected to the pipeline through a sampling tube 25 having one end perforated and extending into the pipeline at an upstream point and another end open and extending into the pipeline at a downstream point. Through this arrangement crude oil flowing in the pipeline is continually passed through the sampling tube. The pressure within the sampling tube acts to force a part of the fluid flowing therein through the conduit 22 and into receiving section 11 of the vessel 10, thereby displacing the piston in an upward direction. Baffles 26 are disposed in the pipeline adjacent to the perforated end of the sample tube in order to assure that the crude oil flowing through the sample tube will be homogeneous.

The rate at which the crude oil enters section 11 is determined by the rate at which the piston 13 may be displaced upwardly within the vessel 10. Displacement of the piston is, in turn, determined by the rate at which clean fluid may be exhausted from section 12 through the conduit 20. Flow through the conduit 20 is governed by a series of flow-restricting orifices in the form of gate valves 27, 28, 29 and 30 disposed therein; each of said gate valves having an aperture of a different area in the gate thereof. Typical diameters of the apertures might be 1/64", 1/32", 3/64" and 1/16". A particular rate of flow through the conduit 20 may be accomplished by closing a restricting gate valve therein having an aperture with desired flow characteristics. It is to be understood that the flow-restricting valves may vary in number without departing from the invention; and that the orifice valves may take other forms, such as, a rotary choke arrangement or a block valve type arrangement.

The conduit 20 is also provided with a manually-operable shut-off valve 31 and remotely-operated automatic shut-off valve 32. The valve 32 is a diaphragm operated in response to pressure in the pipeline or pressure obtained from apparatus disposed upstream in the pipeline, such as, the level-control pilot on a meter or separator (not shown). The conduit 33 transmits pressure from the pipeline or upstream apparatus to valve 32. Through this arrangement valve 32 is only opened when crude oil is flowing within the pipeline.

The conduit 20 also has interposed therein a sight glass 34 to indicate the flow of clean fluid therethrough. In order to prevent any foreign particles from fouling the restricting valves a strainer 36 is interposed in the conduit 20 above said valves. It is to be understood that the strainer 36 may take other forms such as a combination filter-pressure regulator. This would remove foreign particles and regulate pressure of the clean fluid ahead of flow-restricting orifices. Regulating clean fluid pressure below pipeline pressure would provide control of a wider range of flow rates across flow-restricting orifices. A relief valve 37 is disposed at the junction of the conduit 20 and the vessel 10 in order to prevent damaging pressures from building up within said section or conduit.

A conduit 38 is connected to the bottom of the receiving section 11 and provides a passage whereby a crude oil sample in the receiving section may be removed for analysis, returned to the pipeline 21, or recirculated for mixing purposes. A conduit 39, having valves 41 and 42 therein, has one end connected to the conduit 38 and the other end open for removal of a sample for analysis. A conduit 43, having a valve 44 disposed therein, extends between the pipeline 21 and the conduit 39 intermediate the valves 41 and 42 thereon. A conduit 46 having a valve 47 therein extends from the junction of conduits 38 and 39 to a circulating pump 48. A conduit 49, having one end connected to the pump 48 and the other end connected to the conduit 22, communicates with the conduit 46 through a pump 48. A valve 51 is interposed between the ends of conduit 49.

A hand operated pump 52 is provided to return clean fluid from the reservoir 19 to the clean oil section 12 of the vessel 10. The inlet of pump 52 communicates with the lower part of the reservoir through a pipe section 53. The outlet of the pump communicates with the upper end of the section 12 through a conduit 54. A three-way valve 56, having two passages connected to the conduit 54 and a third passage connected to a conduit 57, is disposed intermediate the ends of the conduit 54. The conduit 57 extends between the three-way valve 56 and the reservoir 19. When the three-way valve connects the conduit 54 with the section 12, the pump 52 may be operated to force clean fluid from the reservoir 19 into section 12. Upon turning the three-way valve to connect the reservoir with the section 12 through the conduit 57, the pressures in section 12 and reservoir 19 are equalized. In the latter condition the piston 13 is free to descend within the vessel 10 when pressure is relieved from the section 11 by the withdrawal of a sample therefrom.

The apparatus of the present invention operates in the following manner. Before starting to take a sample the receiving section 11 is exhausted by forcing the piston 13 down through means of fluid pressure exerted on the upper surface of the piston by the clean fluid in section 12. Pressure is generated in the section 12 by actuating the pump 52 and forcing clean fluid from the reservoir 19 through the conduit 54 and valve 56 into the upper end of the section 12. The fluid exhausted from the section 11 may be either returned to the pipeline 21 or dumped from the system. In order to return the exhausted fluid to the pipeline valves 42 and 47 are closed and valves 41 and 44 are opened. If it is desired to dump the exhausted fluid from the system valves 44 and 47 are closed and valves 41 and 42 are opened. The dumped fluid leaves the conduit 39 through valve 42 and may be received in a sampling container if analysis is desired.

After the receiving section 11 is exhausted, the system is prepared to receive a sample of crude oil from the pipeline 21. In this preparation a gate valve in conduit 20, having an orifice through its gate with the desired flow characteristics, is selected and closed while the other apertured gate valves are open. Valves 51 and 56 are then adjusted to prevent flow therethrough and valves 23 and 31 are adjusted to permit flow therethrough.

After the above valves have been adjusted the apparatus is in condition to receive a sample in response to flow through the pipeline. It is noted that the diaphragm valve 32 will open in response to fluid entering the pipeline; said diaphragm valve being actuated by either pressure in the pipeline or pressure from an upstream apparatus, such as, the level control pilot on a meter or separator. With the system in the prepared condition crude oil flowing through the pipeline will pass through the sample tube 25 into the conduit 22. The baffles 26 are disposed adjacent to the perforated inlet of the sample tube 25 to assure that the crude oil passing through the tube is a homogeneous mixture. Pressure within the tube 25 and conduit 22 is sufficient to force a sample of the crude oil into the section 11, thereby displacing the piston 13 in an upward direction. The rate at which the sample is taken is controlled by the rate at which the piston may move upward; which rate is controlled by the rate at which clean fluid is exhausted from the section 12 through the conduit 20 and passed through the flow-restricting orifice valve disposed therein.

In the above manner a cumulative sample of crude oil flowing through the pipeline may be taken over a long period of flow. The rate at which the sample is taken may be accurately governed through the use of the flow restricting valves disposed in conduit 22. A sample thus taken may then be analyzed to determine the content of the crude passing through the pipeline during the period over which the sample was taken.

Before removing a sample through the conduits 38 and 39, as described above, the crude oil in section 11 may be recirculated in order to assure that the removed sample will be homogeneous. Recirculation is accomplished by closing valves 23 and 41 and opening valves 47 and 51. With the latter mentioned valves in this condition actuation of the pump 48 will act to circulate the sample from the section 11 through conduits 38, 46, 49 and 22. After sufficient recirculation of the crude oil a sample thereof may be removed through conduits 38 and 39.

Upon completion of a sampling cycle the apparatus may be prepared, as described above, and used for subsequent samplings. It is noted that flow-restricting valves 27, 28, 29 and 30 are not exposed to the crude oil and therefore, are not subject to be fouled thereby.

The foregoing description of the invention is merely intended to be explanatory thereof. Various changes in the details of the illustrated construction may be made, within the scope of the appended claims, without departing from the spirit of the invention.

I claim as my invention:

1. An apparatus for obtaining a sample of fluid flowing through a pipeline, comprising, a vessel having a chamber therein sealingly divided into two sections by a moveable partition, one of said sections containing clean fluid and the other of said sections providing a receiving chamber for fluid from the pipeline; a clean fluid receiving reservoir; a first conduit connecting said one section with the reservoir whereby clean fluid is conveyed to the reservoir upon displacement of the moveable partition in one direction; flow restricting means in said first conduit; a second conduit connecting said other section with the pipeline whereby pipeline fluid is conveyed to said other section; a third conduit connecting the reservoir with said one section; a return pump disposed in said third conduit whereby clean fluid may be pumped from the reservoir into said one section; a fourth conduit connecting the reservoir with a portion of the third conduit disposed between the return pump and said one section; valve means in said third conduit to selectively open said third or fourth conduits to said one section or close both of said conduits to said one section; a fifth conduit connecting the second conduit with said other section; and a recirculating pump disposed in said fifth conduit.

2. An apparatus for obtaining a sample of fluid flowing through a pipeline comprising a vessel having a chamber therein sealingly divided into two sections by a moveable partition, one of said sections containing clean fluid and the other of said sections providing a receiving chamber for fluid from the pipeline; a first conduit connected to said one section whereby clean fluid may be exhausted therefrom upon displacement of the moveable partition; a plurality of two-position flow restricting valves connected in series in said first conduit, each of said valves being wide open in one position and in the other position presenting an orifice of an area different from those of the other valves; a second conduit connecting said other section with the pipeline whereby pipeline fluid is conveyed to said other section; and means whereby fluid received in said other section may be removed therefrom for analysis.

3. An apparatus according to claim 2 including a sight glass disposed in said first conduit.

4. An apparatus according to claim 2 including baffles disposed in said pipeline in close proximity to and upstream of the connection of the second conduit thereto.

5. An apparatus according to claim 2 wherein the connection of the second conduit to the pipeline comprises a perforated tube extending into said pipeline.

6. An apparatus according to claim 2 including a strainer interposed in the first conduit between said one section and the flow restricting valves.

7. An apparatus according to claim 2 including a remotely-controlled valve disposed in the first conduit, said valve being opened in response to flow through the pipeline.

8. An apparatus according to claim 7 including a manually-actuated shut-off valve disposed in said first conduit.

9. An apparatus according to claim 8 including a relief valve interposed in the first conduit between said one section and the remotely controlled and manually actuated valves.

10. An apparatus according to claim 2 including a reservoir connected to the free end of the first conduit.

11. An apparatus according to claim 10 including a third conduit connecting said one section and the reservoir, said third conduit having valve means therein to selectively stop flow therethrough and pump means therein to transfer clean fluid from the reservoir into said one section.

12. An apparatus according to claim 11 including a fourth conduit extending between said third conduit and the reservoir, and wherein said valve means is adapted to selectively open said third or fourth conduits to said one section or close both of said conduits to said one section.

13. An apparatus according to claim 12 including a fifth conduit interposed between said other section and the second conduit.

14. An apparatus according to claim 13 including valve means disposed in said fifth conduit to selectively confine fluid in the other section, return fluid from the other section to the pipeline, or remove fluid from the section for sampling.

15. An apparatus according to claim 14 including a recirculating pump interposed in said fifth conduit.

16. An apparatus according to claim 13 including a check valve interposed in said second conduit between the connection of the fifth conduit thereto and the pipeline.

References Cited in the file of this patent

UNITED STATES PATENTS

| 2,260,419 | Wrightsman | Oct. 28, 1941 |
| 2,322,018 | Huber | June 15, 1943 |
| 2,636,387 | McKinney et al. | Apr. 28, 1953 |
| 2,986,939 | Gould | June 6, 1961 |

OTHER REFERENCES

Article by F. H. Warren, "Don't Sell Sampling Short," The Oil and Gas Journal, April 9, 1956, vol. 54, No. 49, page 96.